United States Patent Office 3,271,890
Patented Sept. 13, 1966

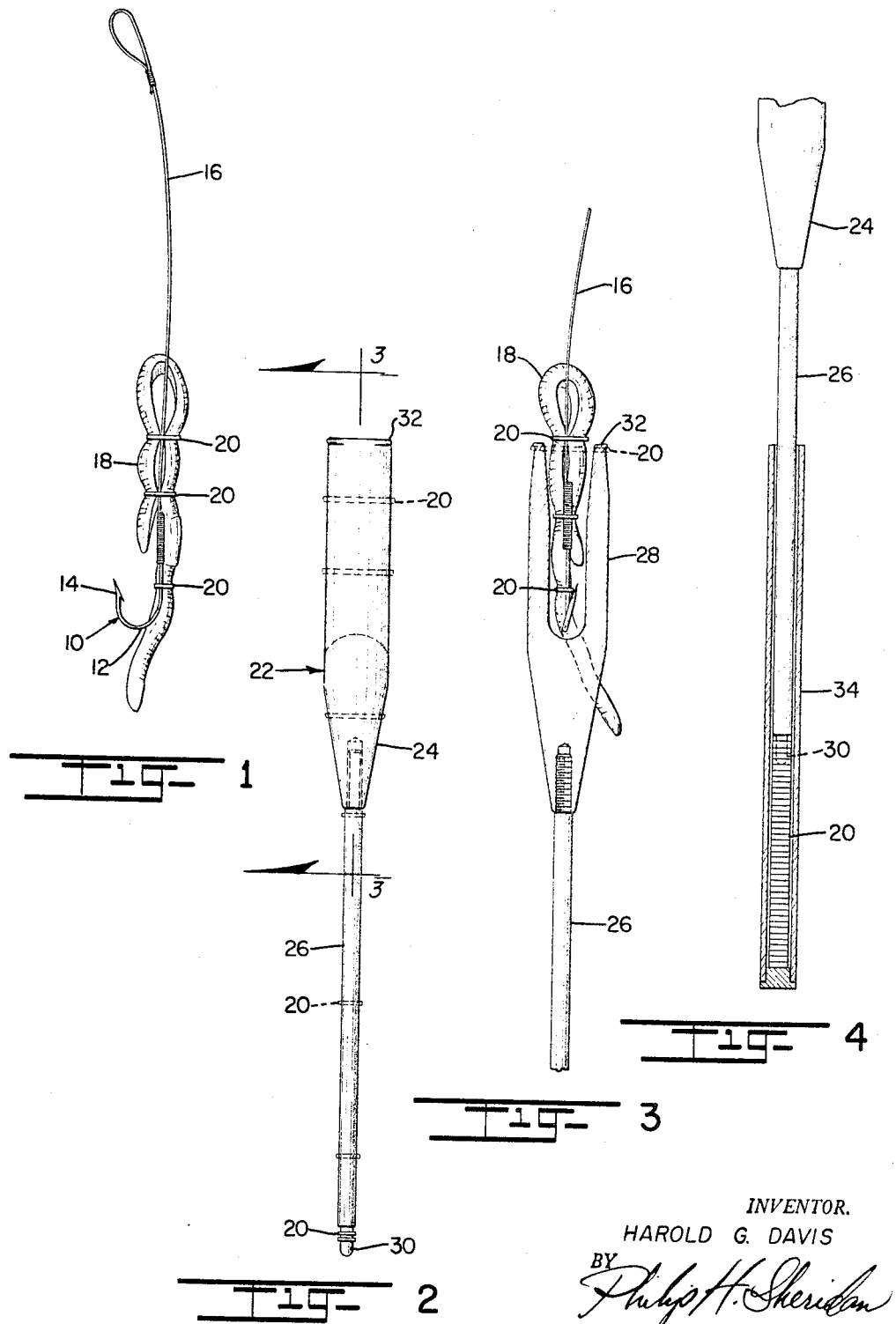

3,271,890
FISH HOOK BAITING DEVICE
Harold G. Davis, 809 E. Ellsworth, Denver 9, Colo.
Filed June 25, 1962, Ser. No. 204,786
1 Claim. (Cl. 43—4)

This invention relates to fishing tackle, more particularly, it relates to a device for applying bait to a fish hook in undamaged condition.

Many forms of live bait are used in fishing, such as angle worms, sand worms, minnows, grasshoppers, shrimp, small frogs, and others. According to present practices live bait such as that mentioned is applied to a fishing hook by piercing the bait with the hook and there are a number of disadvantages associated with this procedure.

Piercing live bait with a hook results in killing it so that there is no movement of the bait when the hook is in the water to attract fish, thus reducing its effectiveness as a fish lure. Also, it is probable that some fish detect that the bait is dead and will not strike at it. Further, if the hook is completely covered with bait it may interfere with the barbed end of the fish hook piercing the fish when he strikes at the bait, particularly, if the bait has a tough skin. A further disadvantage is that if a hard cast is made and the bait has been damaged as a result of being pierced by the hook it is apt to be cast off of the hook.

It is therefore an object of this invention to provide a means for applying live bait to a fish hook in a manner so that the bait will not be damaged.

It is a further object of this invention to provide means for applying bait to a fish hook by which the bait is not pierced by the hook and by means of which the bait is securely attached to the hook so that it will not be lost in casting.

The invention is best understood by reference to the accompanying drawing submitted for the purpose of illustration only in which like parts are represented by like numerals and in which, FIG. 1 is a plan view of a fish hook baited with live bait by means of the device of this invention;

FIG. 2 is a side view of the baiting tool of the invention;

FIG. 3 is a partially cross sectional view taken on the line 3—3 of FIG. 2 showing a fish hook being baited with live bait; and FIG. 4 is a vertical cross section of a container for rubber bands showing the baiting hook being loaded with bands.

For a showing of the end objective achieved by the invention, reference is made to FIG. 1 wherein a hook is shown baited with live bait, such as, an angle worm. The numeral 10 generally indicates an ordinary fish hook having a shank 12 and a barbed hook 14. A leader 16 is attached to the hook by means well known in the art. A piece of live bait, such as, an angle worm 18 is attached to the hook and leader by means of circular elastic members such as, small subber bands, 20. As will be observed, the bait 18 has not been pierced.

Reference is now made to FIG. 2 for a description of the tool 22 of the invention which is used to apply bait to the hook in the manner illustrated in FIG 1. The tool is represented generally by the numeral 22 and consists of a sloping heel section 24 connecting the stem member 26 and fork or prong members 28 (FIG. 3).

In the modification shown in FIGS. 2 and 3, for illustrative purposes only, the stem 26 is provided with threads and is threadably secured to a threaded opening in the bottom of heel section 24 as shown. However the invention is not restricted to this construction as the heel portion need not be sloping but can take any desirable form, and the stem may be made integral with the heel portion so that the tool consists of one integral piece. The tool is preferably made of plastic but may be made of metal or any other suitable rigid material.

The stem member 26 is provided at its end with a stepped down or reduced section 30 for a purpose which will be explained later. Fork or prong members 28 are made integral with sloping heel section 24 in the modification illustrated; however, they may be separate elements and attached by screw threads or otherwise, or they may be telescoping members to nest in heel 24 to permit stowage in a small space. The fork or prong members 28 are preferably of a relatively substantial width and are joined with the stem through the sloping heel section 24. The fork or members 28 are provided with outwardly or externally extending shoulders 32 for a purpose which will be explained hereinafter. The internal surfaces of the prong members 28 are preferably hollowed and sloped from a point below their end to their ends as shown in FIG. 3. This is for the purpose of providing a better opening for the insertion of a hook and bait as shown in FIG. 3. As shown in FIG. 3, the prong members have a common base and are separated at their bases to form a U-shaped opening sufficiently large to permit the bait and hook to extend therethrough.

As will be seen from FIG. 2, the stem portion 26 and reduced portion 30 serve as a magazine for holding rubber bands 20 prior to their being moved up the tool to a position around the fork members 28 below shoulder 32. As will be seen, the shoulder 32 on each of the prong members serves to hold the rubber bands from slipping off of the ends of the members prior to use of the elastic bands in binding the bait to the hook. Other equivalent means for preventing the bands from slipping off the prongs may be used, such as, spring-biased hooks. If desired, the stem member and the outer surfaces of the forked members may be provided with notches not shown to receive the bands 20.

Referring now to FIG. 4, a container of the usual type for storing rubber bands 20 is shown, with stem member 26 inserted into the container for loading the rubber bands on the reduced section 30. The size of the reduced portion 30 and the stem 26 are such that the bands are not stretched to their elastic limit. As will be observed, when the rubber bands have been loaded on the reduced portion 30 they can be slipped up the stem and over the fork members 28 where they are stretched and maintained in the open position. While the elastic member 20 has been illustrated by a rubber band, the invention is not restricted to the use of rubber bands as any equivalent elastic member can be used.

The operation of the device will now be explained in connection with baiting the hook with an angle worm. Preferably the bait, such as, an angle worm is bent back upon itself and around the hook and leader as shown in FIGS. 1 and 3, and the combined hook and angle worm then threaded from the top of the fork members down through the open rubber bands which are held open by the fork members 28, as shown in FIG. 3. As the hook with the bait doubles over it progresses down between the forks the rubber bands are released by pushing them over shoulder 32 to grip the hook and worm at spaced intervals as shown. As the hook is baited it is allowed to proceed through the openings between the bases of the fork members until sufficient elastic members have been applied to securely bind the bait to the hook. Any number of hooks on a single line can, of course, be baited by the use of the baiting tool.

As will be seen by reference to FIG. 1, live bait can be securely attached to the hook without piercing. The bait is free to move, and contraction of the diameter of the bait, such as experienced in the case of angle worms, will not affect attachment of the bait to the hook. Bait attached in above-described manner will not be lost by hard casting.

It will be seen from the above that the invention provides a means for applying live bait to fish hooks in an undamaged condition with the attendant advantages set forth above. The baiting tool is simple in construction and is sufficiently small to be carried in a fishing kit. If it is constructed with a detachable stem then the stem can be detached and the members conveniently stored in a small space in a fishing kit. The device can be inexpensively manufactured.

Obviously, many other modifications and variations of the present invention are possible in the light of the above teachings. It is therefore to be understood that within the scope of the appended claim the invention can be practiced otherwise than as specifically described.

What is claimed is:

A device for attaching live bait to a fish hook with a rubber band which comprises: a substantially circular heel section having a plurality of fork members integrally attached to one end of said heel section, said fork members having outer cylindrical surfaces, being separated by a U-shaped space, and having outwardly extending shoulders and internal outwardly sloping surfaces at their ends; a stem portion of smaller diameter than said heel section for receiving and storing rubber bands integrally attached to the other end of said heel section; and a reduced diameter section at the other end of said stem section for picking up rubber bands, the diameter of said heel section increasing from its said other end to its said one end to provide for gradually spreading said bands as they are moved from said stem to said forks.

References Cited by the Examiner

UNITED STATES PATENTS

| | | | |
|---|---|---|---|
| 823,877 | 6/1906 | Kellogg | 128—326 |
| 2,463,621 | 3/1949 | Herzog | 43—11 X |
| 2,619,964 | 12/1952 | Thaete | 128—303 |
| 2,764,160 | 9/1956 | Alexander et al. | 128—303 |
| 2,846,803 | 8/1958 | Rettig | 43—4 |
| 2,856,676 | 10/1958 | Furst | 29—207 |
| 2,885,814 | 5/1959 | Schlador | 43—4 |
| 3,067,499 | 12/1962 | Shaw | 29—212 |

FOREIGN PATENTS 774,018   9/1934   France.

ABRAHAM G. STONE, *Primary Examiner.*

B. J. WILHITE, *Assistant Examiner.*